(12) United States Patent
Huang (10) Patent No.: US 9,292,434 B2
(45) Date of Patent: Mar. 22, 2016

(54) METHOD AND APPARATUS FOR RESTORING FLASH TRANSLATION LAYER (FTL) IN NON-VOLATILE STORAGE DEVICE

(71) Applicant: Yiren Ronnie Huang, San Jose, CA (US)

(72) Inventor: Yiren Ronnie Huang, San Jose, CA (US)

(73) Assignee: CNEXLabs, Inc., San Jose, CA (US)

( * ) Notice: Subject to any disclaimer, the term of this patent is extended or adjusted under 35 U.S.C. 154(b) by 27 days.

(21) Appl. No.: 14/466,858

(22) Filed: Aug. 22, 2014

(65) Prior Publication Data

US 2015/0058539 A1  Feb. 26, 2015

Related U.S. Application Data

(60) Provisional application No. 61/868,961, filed on Aug. 22, 2013.

(51) Int. Cl.
*G06F 12/02* (2006.01)
*G06F 17/30* (2006.01)
*G06F 11/14* (2006.01)

(52) U.S. Cl.
CPC ............ *G06F 12/0246* (2013.01); *G06F 11/14* (2013.01); *G06F 17/30321* (2013.01); *G06F 2212/1016* (2013.01); *G06F 2212/7201* (2013.01)

(58) Field of Classification Search
CPC  G06F 12/0246; G06F 11/14; G06F 17/30321
USPC .......................... 711/103, 154, 156, 202, 221; 365/185.33; 707/639, 679; 714/6.11, 714/15
See application file for complete search history.

(56) References Cited

U.S. PATENT DOCUMENTS

| | | | | |
|---|---|---|---|---|
| 8,122,193 B2* | 2/2012 | Song | ...................... | G06F 3/0616 711/117 |
| 8,533,391 B2* | 9/2013 | Song | ...................... | G06F 3/0616 711/103 |
| 9,032,245 B2* | 5/2015 | Roh | ........................ | G06F 11/20 714/6.22 |
| 2011/0320689 A1* | 12/2011 | Cho | .................... | G06F 12/0246 711/103 |
| 2015/0019797 A1* | 1/2015 | Huang | ................ | G06F 12/0246 711/103 |
| 2015/0019798 A1* | 1/2015 | Huang | ................ | G06F 12/0246 711/103 |

* cited by examiner

Primary Examiner — Stephen Elmore
(74) Attorney, Agent, or Firm — James M. Wu; JW Law Group (57) ABSTRACT

A method and apparatus configured to restore a flash translation layer ("FTL") in a non-volatile ("NV") storage device are disclosed. After reactivating the NV storage device from an unintended system crash, a process of recovering FTL, in one embodiment, receives a request for restoring at least a portion of the FTL or FTL database. After identifying sequence numbers ("SNs") associated with flash memory blocks ("FMBs") which are generated during write cycle(s), the SNs are retrieved from the information storage locations such as state information in the FMBs. A portion of the FTL database is subsequently reconstructed in a random access memory ("RAM") according to the SNs. In an alternative embodiment, logical block addresses ("LBAs"), LBA lists, and/or index tables can also be used to restore the FTL database or table.

23 Claims, 11 Drawing Sheets

METHOD AND APPARATUS FOR RESTORING FLASH TRANSLATION LAYER (FTL) IN NON-VOLATILE STORAGE DEVICE

PRIORITY

This application claims the benefit of priority based upon U.S. Provisional Patent Application Ser. No. 61/868,961, filed on Aug. 22, 2013 in the name of the same inventor(s) and having a title of "Method and Apparatus for Providing Flash Translation Layer (FTL) Database Recovery in a SSD Device," hereby incorporated into the present application by reference.

FIELD

The exemplary embodiment(s) of the present invention relates to the field of semiconductor and integrated circuits. More specifically, the exemplary embodiment(s) of the present invention relates to non-volatile ("NV") storage devices.

BACKGROUND

With increasing popularity of electronic devices, such as computers, smart phones, mobile devices, server farms, mainframe computers, and the like, the demand for more and faster data is constantly growing. To handle and facilitate voluminous data between such electronic devices, high speed NV memory devices are typically required. A conventional type of NV memory device, for example, is a flash memory based storage device such as solid-state drive ("SSD").

The flash memory based SSD, for example, is an electronic NV computer storage device capable of maintaining, erasing, and/or reprogramming data. The flash memory can be fabricated with several different types of integrated circuit ("IC") technologies such as NOR or NAND logic gates with, for example, floating-gate transistors. Depending on the applications, a typical memory access of flash memory can be configured to be a block, a page, a word, and/or a byte.

To properly map or translate between a logical block address ("LBA") and a physical page address ("PPA"), a flash translation layer ("FTL") is used in a flash memory based storage device. A conventional FTL translates between LBA to actual physical address or PPA of storage device. Note that LBA is used to address a block of data seeing by an input and output ("IO") device of SSD while PPA is used to address a storage location where the block data is actually stored. A problem, however, associate with FTL or FTL database or FTL table is that the FTL database is large and it is typically difficult to recover if the storage device, for example, powers down unexpectedly.

SUMMARY

A method and apparatus capable of restoring a flash translation layer ("FTL") in a non-volatile ("NV") storage device are disclosed. After reactivating the NV storage device from an unintended system power down, a process of recovering FTL, in one embodiment, receives a request for restoring at least a portion of the FTL or FTL database. After identifying sequence numbers ("SNs") associated with flash memory blocks ("FMBs") which are generated during write cycle(s), the SNs are retrieved from the information storage locations such as state information in the FMBs. A portion of the FTL database is subsequently reconstructed in a random access memory ("RAM") in response to the SNs. In an alternative embodiment, logical block addresses ("LBAs"), LBA lists, and/or index tables can also be used to assist restoring the FTL database or table.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the present invention are described herein with context of a method and/or apparatus for recovering an FTL database using sequence numbers in a SSD.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the present invention discloses a process of restoring FTL after the NV storage device such as an SSD accidentally powers down. After reactivating the NV storage device from an unintended system crash, a process of recovering FTL receives a request for restoring at least a portion of the FTL or FTL database. After identifying sequence numbers ("SNs") associated with flash memory blocks ("FMBs") where SNs are generated during write cycles, the SNs are retrieved from the information storage locations such as state information in the FMBs. A portion of the FTL database is subsequently reconstructed in a random access memory ("RAM") according to the SNs. In an alternative embodiment, logical block addresses ("LBAs"), LBA lists, and/or index tables are also used to assist restoration of the FTL database. To simply forgoing discussion, the terms "FTL," "FTL database," and "FTL tables" are referred to the same or substantially same element and they can be used interchangeably.

Figure 1:
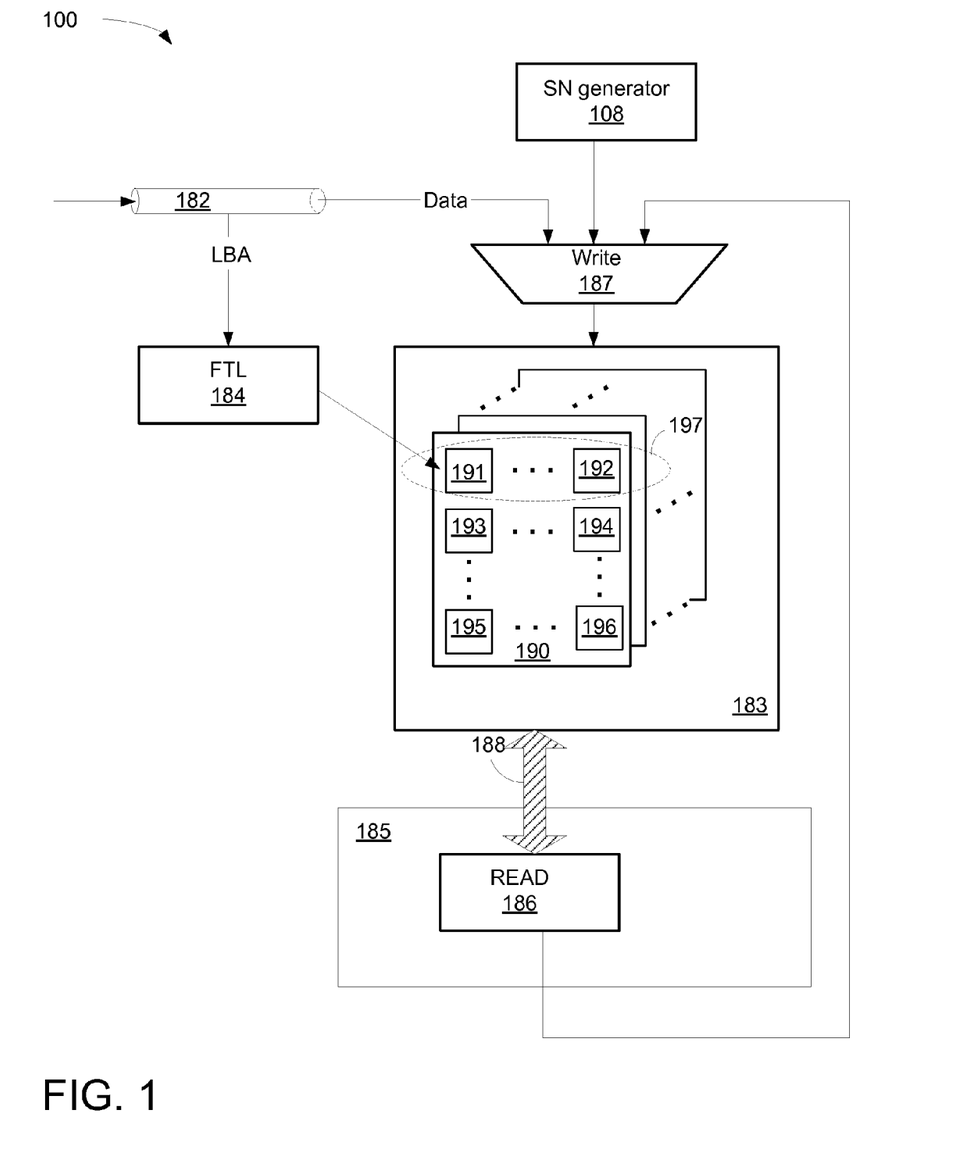
FIG. 1 is a block diagram illustrating a non-volatile ("NV") storage device capable of restoring a flash translation layer ("FTL") or FTL database in accordance with sequence numbers ("SNs") in accordance with one embodiment of the present invention.

FIG. 1 is a block diagram illustrating a NV storage device capable of restoring a FTL database based on SNs in accordance with one embodiment of the present invention. Diagram 100 includes input data 182, storage device 183, output port 188, and storage controller 185. Storage controller 185 further includes read module 186, SN generator 108, and/or write module 187. Diagram 100 also includes a FTL 184 which can be part of storage controller 185. FTL 184, for example, maps logical block addresses ("LBAs") to physical addresses. It should be noted that the underlying concept of the exemplary embodiment(s) of the present invention would not change if one or more blocks (or devices) were added to or removed from diagram 100.

A flash memory based storage device such as SSD, for example, includes multiple arrays of flash memory cells for data storage. The flash memory, which generally has a read latency less than 100 microseconds ("μs"), is organized in blocks and pages wherein a minimum access unit, for example, can be set to four (4) kilobyte ("Kbyte"), eight (8) Kbyte, or sixteen (16) Kbyte memory capacity depending on the flash memory technologies. Other types of NV memory, such as phase change memory ("PCM"), magnetic RAM ("MRAM"), STT-MRAM, or ReRAM, can also be used in storage device 183. To simplify the forgoing discussion, the flash memory or flash memory based SSD is herein used as an exemplary NV storage device. Also, a four (4) Kbyte page or flash memory page ("FMP") is used for the forgoing discussion.

The SSD includes multiple non-volatile memories or FMBs 190, FTL 184, and storage controller 185. Each of FMBs 190 further includes a set of pages 191-196 wherein each page such as page 191 has a block size of 4096 bytes or 4 Kbyte. In one example, FMBs 190 can contain from 128 to 512 pages or sectors or blocks 191-196. A page or block is generally a minimal writable unit. Flash memory 183 is able to persistently retain information or data for a long period of time without power supply.

FTL 184, which is implemented in DRAM, includes a FTL database or table that stores mapping information. For example, the size of FTL database is generally a positive proportion to the total size of SSD storage capacity. For instance, one way to implement the FTL in SSD is that it uses a DRAM size that approximately equals to $\frac{1}{1000}$ of SSD capacity. For example, because each FMP may be 4 Kbyte and each entry of FTL database is 4 byte, the size of FTL database can be calculated as SSD capacity/4 KByte*4 Byte (SSD capacity/1000) which is approximately 1 over 1000 (or $\frac{1}{1000}$).

To optimize FTL size for FTL recovery, the SSD total storage range, in one embodiment, is divided into multiple divided namespaces. Each space or namespace has a smaller storage size whereby a smaller size of FTL database is required. A smaller size of FTL database is quick to restore. Also, a smaller FTL database reduces overall overhead whereby it improves read and/or write latency.

In operation, upon receipt of data input or data packets 182, FTL 184 maps LBA to PPA in storage device 183. After identifying PPA, write circuit 187 writes the data from data packets 182 to a page or pages within a block pointed by PPA. After storing data at a block such as block 190, a SN associated to block 190 is fetched from SN generator 108 and subsequently stores the SN at a predefined location such as state information section of block 190. Also, the data stored in storage device 183 can be refreshed using read module 186 via output port 188.

Upon occurrence of unintended system power down or crash, the FTL database could be lost since the FTL database generally operates in DRAM and storage controller may not have enough time to save the FTL database before the system is shut down. Upon recovering of storage device 183, the FTL database needs to be restored or recovered before storage device 183 can be accessed. In one embodiment, the FTL database can be restored or reconstructed in response to values of SNs and LBAs which can be retrieved from storage device 183.

An advantage of employing SN to restore an FTL database is that it is able to restore the FTL database within reasonable expected time frame.

Figure 2:
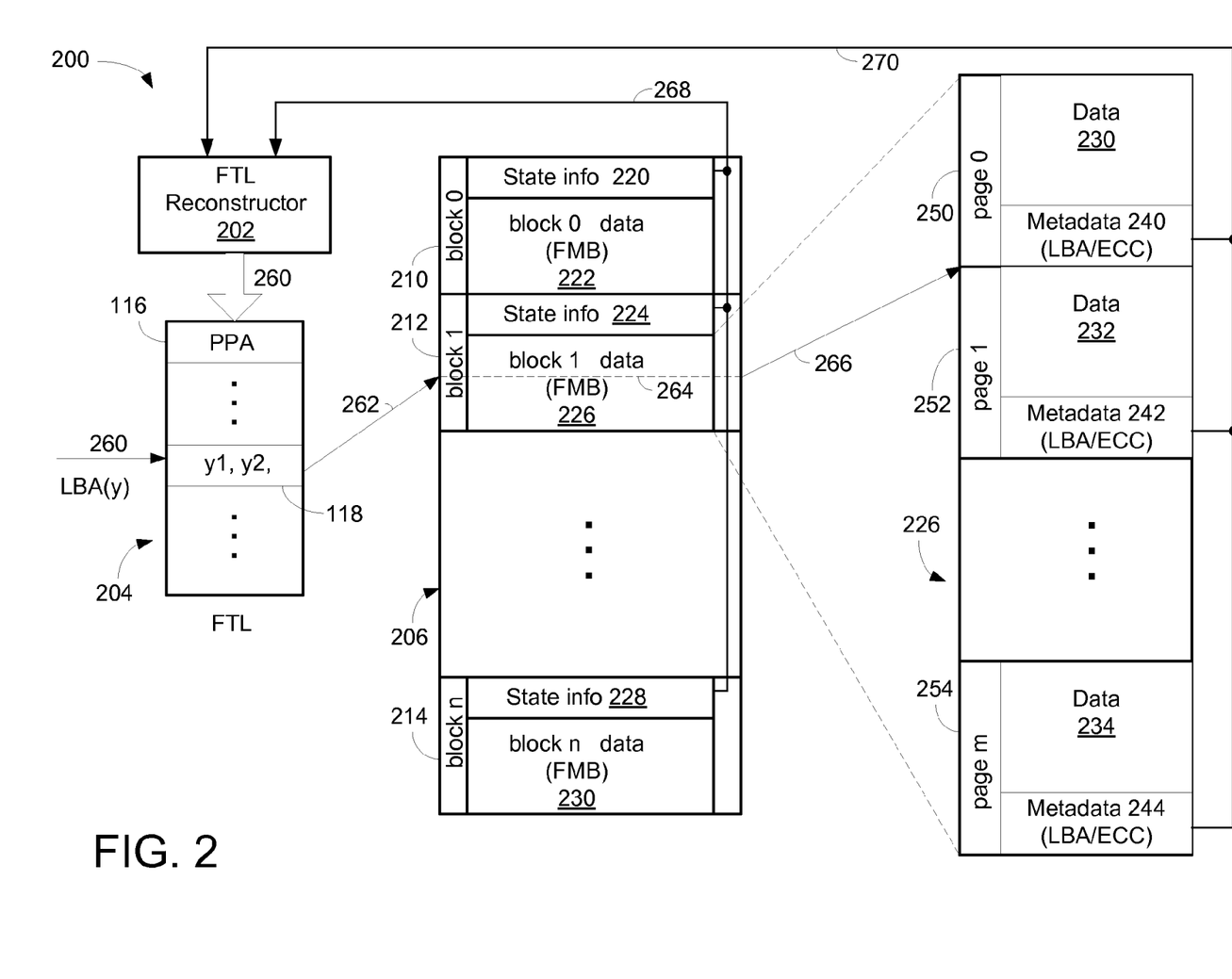
FIG. 2 is a block diagram illustrating an NV storage device able to use SNs and logical block addresses ("LBAs") to reconstruct the FTL database in accordance with one embodiment of the present invention.

FIG. 2 is a block diagram 200 illustrating an NV storage device able to use SNs and LBAs to reconstruct a FTL database in accordance with one embodiment of the present invention. Diagram 200 includes a FTL database 204, a FTL reconstructor 202, and a storage device 206. Storage device 206 is structured to contain multiple blocks or flash memory blocks ("FMBs") 210-214. It should be noted that the underlying concept of the exemplary embodiment(s) of the present invention would not change if one or more blocks (or components) were added to or removed from diagram 200.

Storage device 206, which can be flash memory based NV memory, contains FMBs or blocks 210-214 organized as block 0 to block n. In one example, block 210 includes state information section 220 and data storage 222. Block 212 includes a state information section 224 and data storage 226. Block 228 includes a state information section 228 and data storage 230. Depending on the flash technologies, storage device 206 can have a range of FMBs from 1,000 to 32,000 blocks. Block 0 to block n can be referred to as a user LBAs range, namespace, and/or logical unit number ("LUN"), where n is the size of the user LBA range or namespace. 0 to n sectors or blocks are the individual block or sector in the LBA range or namespace. While data storage 222 or 226 stores data or digital information, state information 220 or 224 stores metadata such as sequence number and error log. Data storage such as data storage 226 is further divided into multiple pages or FMPs 250-254.

Block 212 of data storage 226, in one aspect, includes multiple FMPs 250-254 as page 0 through page m. For example, page 250 includes data section 230 and metadata section 240 wherein metadata 240 may store information relating to page 250 such as LBA and error correction code ("ECC"). Similarly, page 252 includes data section 232 and metadata section 242 wherein metadata 242 may store information relating to page 252 such as LBA and ECC. Depending on the flash technologies, each block can have a range of FMPs from 128 to 1024 pages.

FTL 204, in one embodiment, includes a database or table having multiple entries wherein each entry of database stores PPA associated with an LBA. For example, entry 118 of FTL 204 maps LBA(y) 260 to PPA pointing to block 212 as indicated by arrow 262. Upon locating block 212, page 252 is identified as indicated by arrows 262-266. It should be noted that one PPA can be mapped to multiple different LBAs.

FTL reconstructor 202, in one embodiment, is able to reconstruct or restore at least a portion of FTL 204 based on SNs stored in the state information sections from FMBs and LBAs stored in the metadata sections of FMPs. For example, FTL reconstructor 202 retrieves LBAs via bus 270 from FMPs and SNs from bus 268 from FMBs. SNs and LBAs are used to assist reconstructing FTL database 204.

In one embodiment, FTL metadata including SNs and error logs is attached or stored to each FMB during data write cycles. The entries of FTL table are gathered for the benefit of reading efficiency since data may read one FMP at a given time. Each FTL metadata stored in the state information section of a FMB includes a SN associated with the FMB. It should be noted that the bigger SN or higher value of SN means the data written to the FMB is more recent which indicates that the later written data is more up-to-date information.

During an FTL restoration process, the previous or older data residing in the entries of FTL database of the same namespace could be overwritten by newer data indicated by the values of SNs. The FTL metadata can be alternatively attached to one block or part of one block. During reconstruction, metadata such LBAs from metadata section, in one example, may be copied or duplicated in the entries of FTL table based on the values of Ns.

In one example, FTL metadata is written to the state information of FMB at an end of write cycle. Each time a group of pages in a FMB or a fixed group of FMBs is accessed by one or multiple buses, FTL metadata should be stored at the end of write cycle. Note that SN of FMB or group of FMBs can also be written together based on the applications. When a block is closed, the next block will be chosen and the next block number will receive a new SN which is the next SN.

It should be noted that SNs are in an incremental order or a sequential order such as 1, 2, 3, and so forth. After retrieving of SNs from every block during an FTL recovery, a sorting module which can be hardware or software, arranges FMBs in a sequential order from the oldest block to newer block based on SNs. For example, an LBA with a larger value of SN can replace an LBA with a smaller value of SN.

Figure 3:
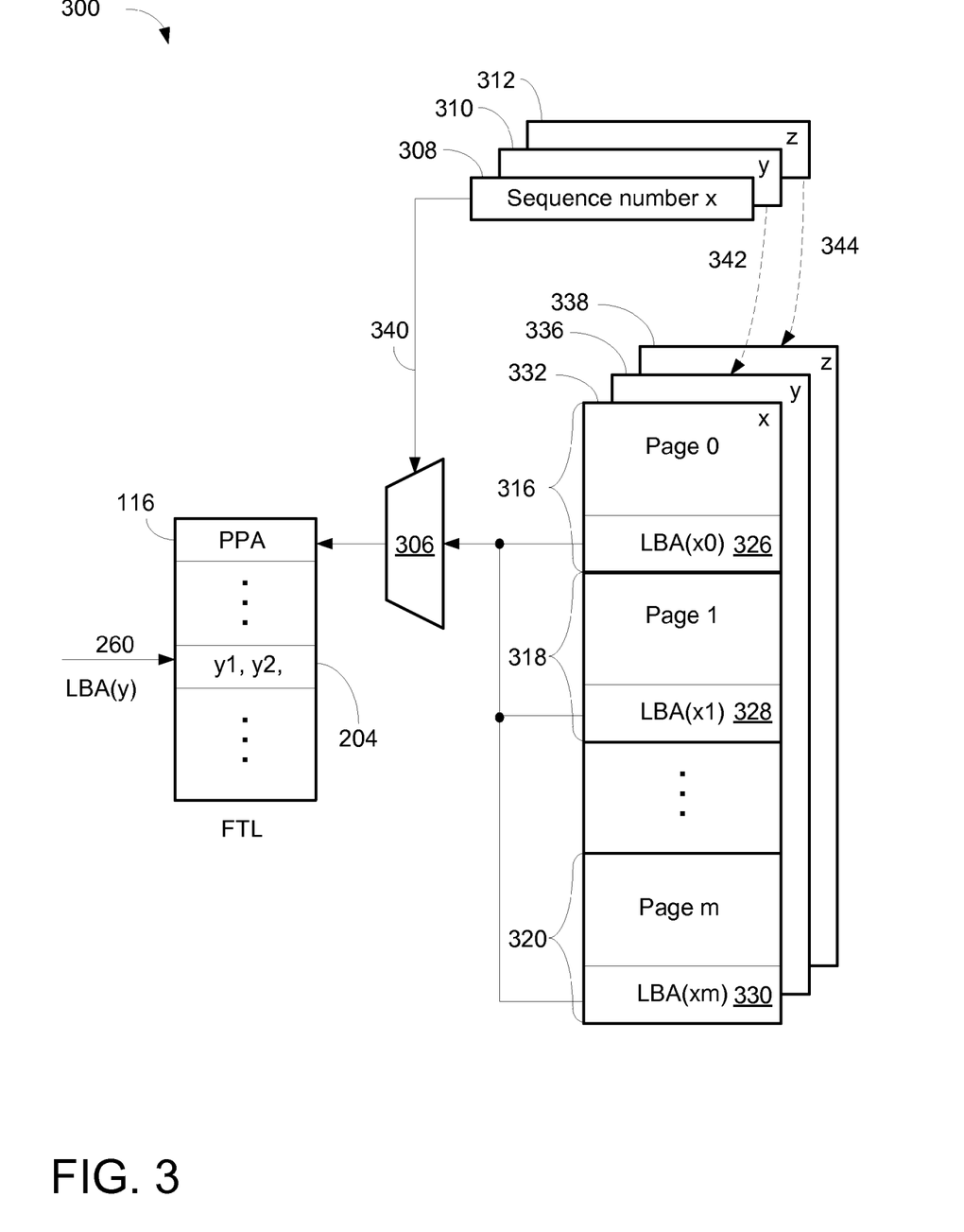
FIG. 3 is a logic diagram illustrating a logic flow of recovering a FTL database using SNs and LBAs in accordance with one embodiment of the present invention.

FIG. 3 is a logic diagram 300 illustrating a logic flow of recovering a FTL database using SNs and LBAs in accordance with one embodiment of the present invention. Diagram 300 includes FTL database 204, FMBs 332-338, SNs 308-312, and sorter 306. FMB 332 is referred to as block x and FMB 336 is referred to as block y. FMB 338, in this example, is referred to as block z. Each FMB such as FMB 332 further includes multiple FMPs or pages 316-320 wherein each page contains a data section and metadata section such as section 326. It should be noted that the underlying concept of the exemplary embodiment(s) of the present invention would not change if one or more blocks (or components) were added to or removed from diagram 300.

During an operation, SN 308 and LAB(x0) through LBA (xm) of FMB 332 are used to assist recovering FTL database 204. After FMB 332, SN 310 and LAB(y0) through LAB (ym) are then used to assist recovering FTL database 204. If multiple LABs are assigned to a single PPA, the last written LAB indicated by SN prevails. It should be noted that SN 310 is for block 336 as indicated by arrow 342 and SN 312 is for block 338 as indicated by arrow 344. After FMB 336, SN 312 and LAB(z0) through LAB (zm) are used to assist restoring FTL database 304. It should be noted that additional FMBs can be added in diagram 300. The recovery process completes when all blocks and pages are processed.

Once the NV storage device is reactivated, the FTL recovery process receives a request for restoring at least a portion of FTL database. After identifying LBAs associated with FMPs in the NV storage device, the LBAs are retrieved from metadata storage locations or metadata sections of FMPs. A portion of FTL database in a RAM can be reconstructed or restored in response to the LBAs and the physical locations of the FMPs within the FMB.

It should be noted that FTL metadata such as LBA associated with PPA of the FMP is stored during the write cycle or end of write cycle. The method, for example, is able to store LBA associated with the PPA which points to the FMP in the metadata section of the FMP at the time the data was stored in the FMP. Note that metadata section can also be referred to metadata, metadata page section, and the like. It should be noted that a later stored LBA should replace an earlier stored LBA in the same entry of the FTL database during the FTL recovery process.

Figure 4:
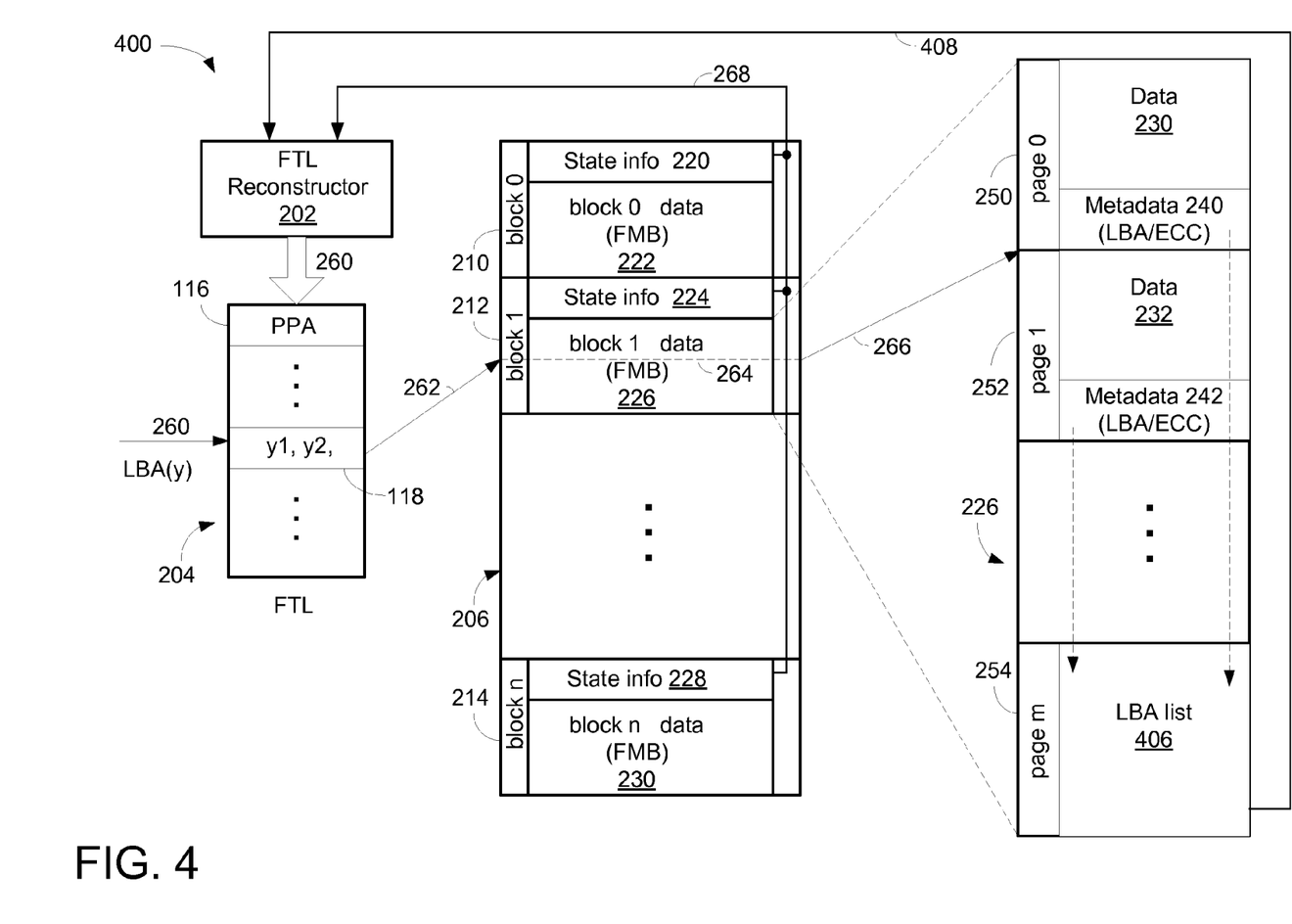
FIG. 4 is a logic diagram illustrating an NV storage device capable of using an LBA list to restore the FTL database in accordance with one embodiment of the present invention.

FIG. 4 is a logic diagram 400 illustrating an NV storage device capable of using an LBA list to restore the FTL database in accordance with one embodiment of the present invention. Diagram 400, which is similar to diagram 200 shown in FIG. 2, includes FTL database 204, FTL reconstructor 202, and storage device 206. Storage device 206 is structured to contain multiple FMBs or blocks 250-254. It should be noted that the underlying concept of the exemplary embodiment(s) of the present invention would not change if one or more blocks (or components) were added to or removed from diagram 400.

Each FMB includes a range of 256 to 512 FMPs. Block 212, in one aspect, includes multiple FMPs 250-254 as page 0 through page m where m is 255. In one embodiment, page m of FMP 212 contains an LBA list 406. Each FMB, in one aspect, dedicates a page or a section of storage space to store an LBA list which lists LBAs loaded from other FMPs in FMB 212 as indicated by dotted arrows. During a recovery operation, LBA list 406 is obtained by FTL reconstructor 202 via bus 408.

An advantage of using LBA lists from FMBs is that it improves efficiency of restoring FTL database because searching and fetch LBA from every page in a block is no longer required.

Figure 5:
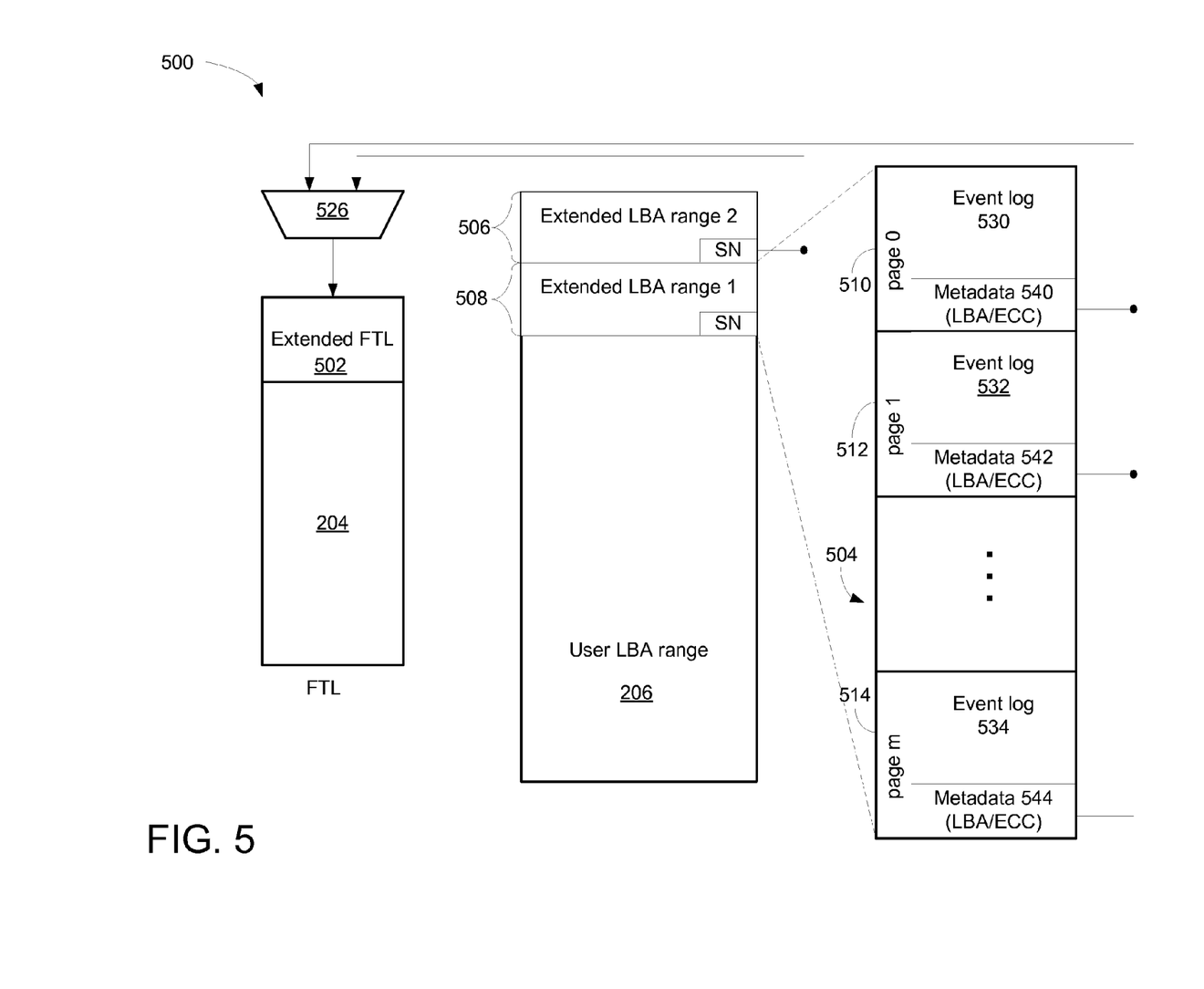
FIG. 5 is a logic diagram illustrating an NV storage device capable of using SNs to restore extended FTL database in accordance with one embodiment of the present invention.

FIG. 5 is a logic diagram 500 illustrating an NV storage device capable of using SNs to restore extended FTL database in accordance with one embodiment of the present invention. Diagram 500 includes FTL or FTL database 204, data storage or namespace 206, and extended LBAs 506-508. FTL 204 also includes an extended FTL 502 which is used to map extended LBAs to extended PPAs. It should be noted that the underlying concept of the exemplary embodiment(s) of the present invention would not change if one or more blocks (or components) were added to or removed from diagram 500.

Extended LBA range, in one aspect, is organized as FMBs or blocks wherein extended LBA range 506 is configured to have the same structure as a block. For example, extended LBA range 508, as a block, includes a set of FMPs 510-514. Each FMP such as page 510 further includes information or event log section 530 and metadata section 540. Event log section 530 stores non-user information such as error logs, events, and/or statistic. Metadata section 540 stores information such as LBA and ECC associated with page 510.

Extended FTL 502 is used to map LBAs or extended LBAs to extended PPAs at extended LBA ranges 506-508. In one aspect, extended LBA ranges 506-508 also stores SNs for FTL restoration. During a recovery process, reconstructor 526 can restore extended FTL 502 according to SNs stored in extended LBA ranges 506-508 and LBAs stored at metadata sections 540-544. It should be noted that LBA list for each extended LBA range can also be implemented to improve the recovery speed and efficiency.

An extended LBA range can be defined as an extra range or storage capacity on top of user LBA range. The extended LBA range is generally not visible to users but it is visible to the storage controller such as SSD controller driver or firmware. In one aspect, the extended LBA range is used to store snapshots of important system data such as block management table, SSD state information, SSD event log entries, FTL database, and so on.

After the FTL database is reconstructed in DRAM, the process can look up the FTL table or database in accordance with received LBA. Once the actual physical address or PPA is identified, the data stored in the page pointed by the physical address is read. It should be noted that since the size of FTL database is based on the total storage capacity, it is advantageous to divide namespaces into multiple smaller storage capacities whereby managing and recovering FTL database should be simplified.

A user LBA range, also known as a namespace, can be divided into multiple smaller divided namespaces. The divided namespace is easier to manage due to smaller in size. The FTL database for a smaller divided namespace, in one example, can be implemented entirely in the on-chip SRAM instead of DRAM. In addition, with smaller size of divided namespace, less number of FMBs is used for data storage. The smaller number of FMBs uses less FTL entries whereby the restoration of FTL table or database can be achieved quickly without significantly impact overall system performance.

Figure 6:
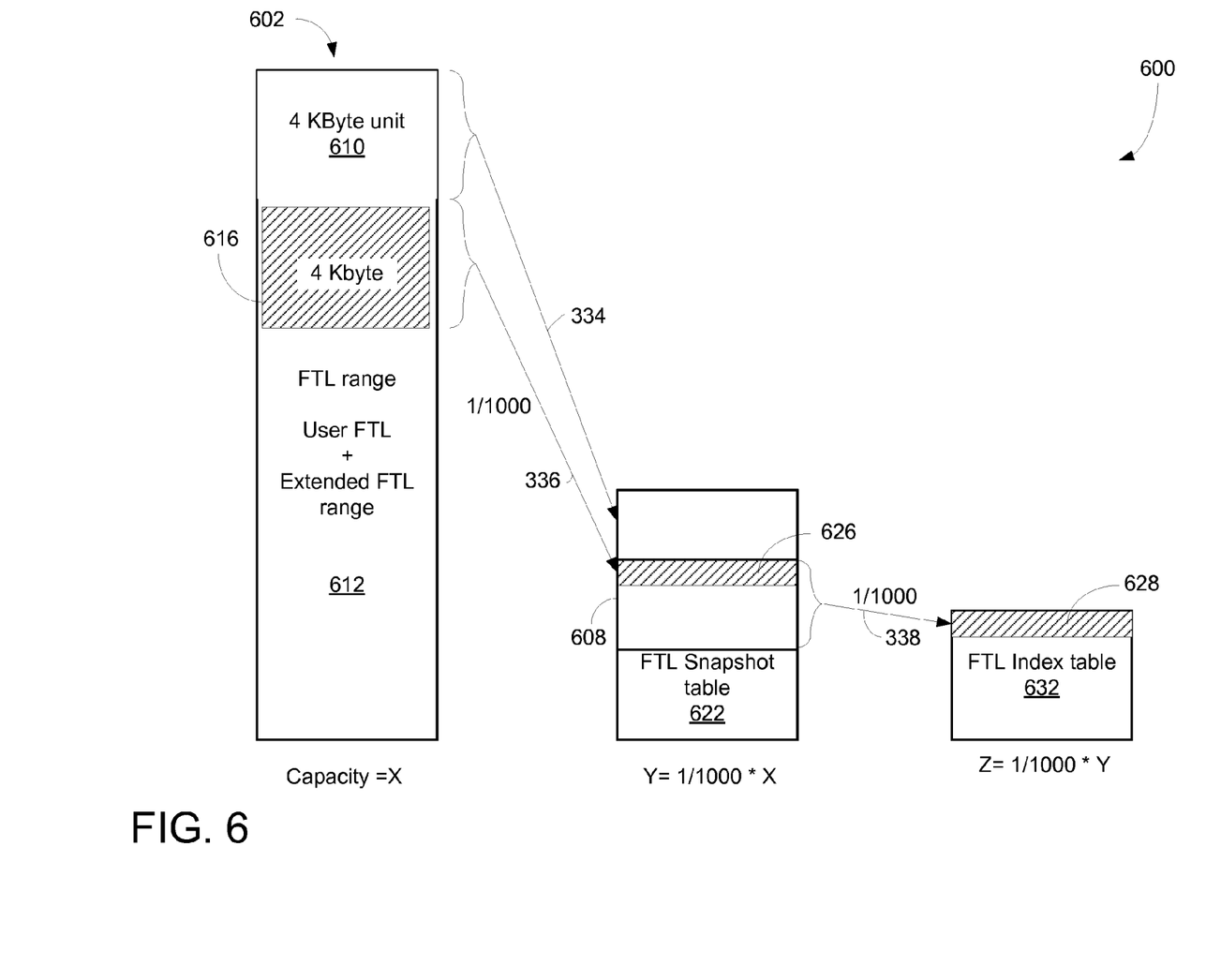
FIG. 6 is a diagram illustrating an NV storage device capable of recovering FTL database using an FTL index table in accordance with one embodiment of the present invention.

FIG. 6 is a diagram 600 illustrating an NV storage device able to restore an FTL database using FTL index table in accordance with one embodiment of the present invention. Diagram 600 includes a storage area 602, FTL snapshot table 622, and FTL index table 632 wherein storage area 602 includes storage range 612 and an extended range 610. Storage range 612 can be accessed by user FTL plus extended FTL range. FTL snapshot table 606 is a stored FTL database at a giving time. In one embodiment, FTL snapshot table 606 is stored at extended FTL range 610 as indicated by numeral 334. It should be noted that the underlying concept of the exemplary embodiment(s) of the present invention would not change if one or more blocks (or components) were added to or removed from diagram 600.

Each entry of FTL database or FTL snapshot table such as entry 626 is set to a predefined number of bytes such as 4 bytes. Entry 626 of FTL snapshot table 622, in one example, points to 4 Kbyte data unit 616 as indicated by numeral 336. FTL snapshot table 622 is approximately $1/1024^{th}$ of the LBA range which includes user and extended ranges (or storage area) 612. If storage area 612 has a capacity of X, FTL snapshot table 622 is $1/1000$ multiples with X. For example, if storage area 612 has a capacity of 512 gigabyte ("GB"), FTL snapshot table 622 should be approximately 512 megabyte ("MB") which is $1/1000$ X 512 GB.

FTL index table 632 is approximately $1/1024^{th}$ of FTL snapshot table 622 since each entry 628 of FTL index table 632 points to 4 Kbyte entry 608 of FTL snapshot table 622. If FTL snapshot table has a capacity of Y which is X/1000 where X is the total capacity of storage area 612, FTL index table 532 is $1/1000$ multiples Y. For example, if FTL snapshot table 622 has a capacity of 512 MB, FTL index table 632 should be approximately 512 kilobyte ("KB") which is $1/1000$ X 512 MB.

In operation, before powering down the storage device, the FTL database or table is saved in FTL snapshot table 622. FTL index table 632 is subsequently constructed and stored in extended FTL range 610. After powering up the storage device, FTL index table 632 is loaded into DRAM of the controller for rebooting the storage device. Upon receiving an IO access with LBA for storage access, FTL index table 632 is referenced. Based on the identified index or entry of FTL index table 632, a portion of FTL snapshot table 622 which is indexed by FTL index table 632 is loaded from FTL snapshot table 622 into DRAM. The portion of FTL snapshot table is subsequently used to map or translate between LBA and PPA. In one aspect, FTL table or database is reconstructed based on the indexes in FTL index table 632. Rebuilding or restoring one portion of FTL database at a time can be referred to as building FTL table on demand, which improves system performance by using resources more efficiently.

An advantage of using an FTL index table is that it allows a storage device to boot up more quickly.

Figure 7:
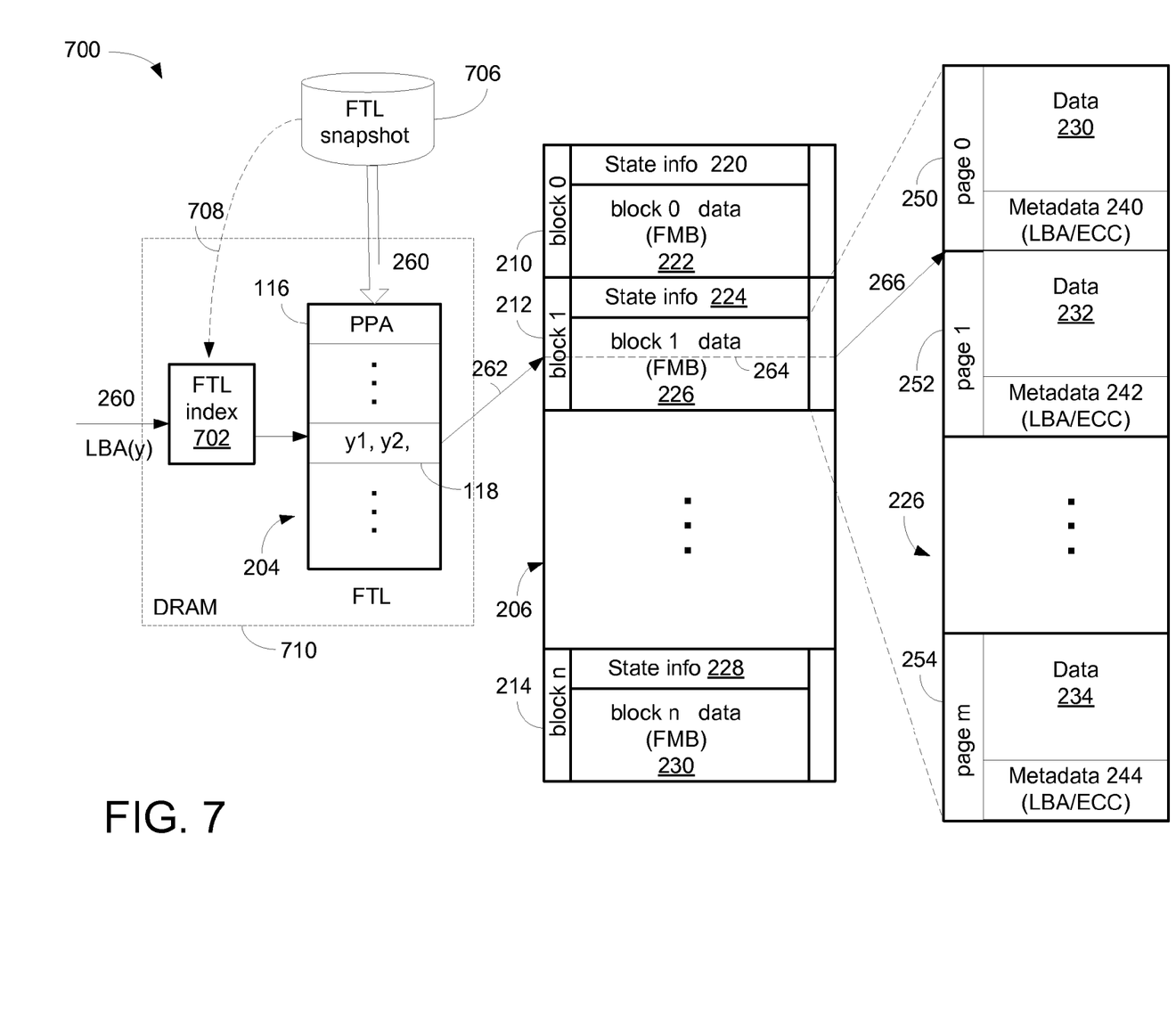
FIG. 7 is a logic diagram illustrating a process of using FTL index table to restore the FTL database in accordance with one embodiment of the present invention.

FIG. 7 is a logic diagram 700 illustrating a process of using FTL index table to restore the FTL database in accordance with one embodiment of the present invention. Diagram 700 is similar to diagram 200, shown in FIG. 2, except that diagram 700 includes FTL index table 702 which can be loaded into DRAM 710 for LBA mapping. Diagram 700 includes FTL database 204, FLT index table 702, FTL snapshot table 706, and storage device 206. FTL snapshot storage 706, in one embodiment, resides in the extended LBA range and contains FTL snapshot table and FTL index table 702. It should be noted that the underlying concept of the exemplary embodiment(s) of the present invention would not change if one or more blocks (or components) were added to or removed from diagram 700.

In operation, upon receiving a request for restoring at least a portion of FTL database after reactivating or rebooting a flash based NV storage device, FTL index table 702 containing indexes is retrieved from FTL snapshot storage 706. Each entry or index in FTL index table 702 points a unique portion of the FTL snapshot table. The unique portion of the FTL snapshot table can indicate a 4 Kbyte section of FTL database. In one example, FTL snapshot storage 706 is stored in a predefined index location of the NV storage device. After FTL index table 702 is loaded, a portion of the FTL database is restored in DRAM 710 in response to indexes in the FTL index table 702 and a recently arrived LBA associated with an IO access.

A system having a 512 GB SSD and 512 MB FTL snapshot, for instance, uses an FTL index table to boot the storage device. Since the FTL index table is 1/1000 of FTL snapshot table, the size of FTL index table is 512 KB. To boot the storage device, loading a 512 KB FTL index table into a volatile memory generally requires less than 5 milliseconds ("ms") and consequently, the total boot time for booting the device should not take more than 100 ms.

Figure 8:
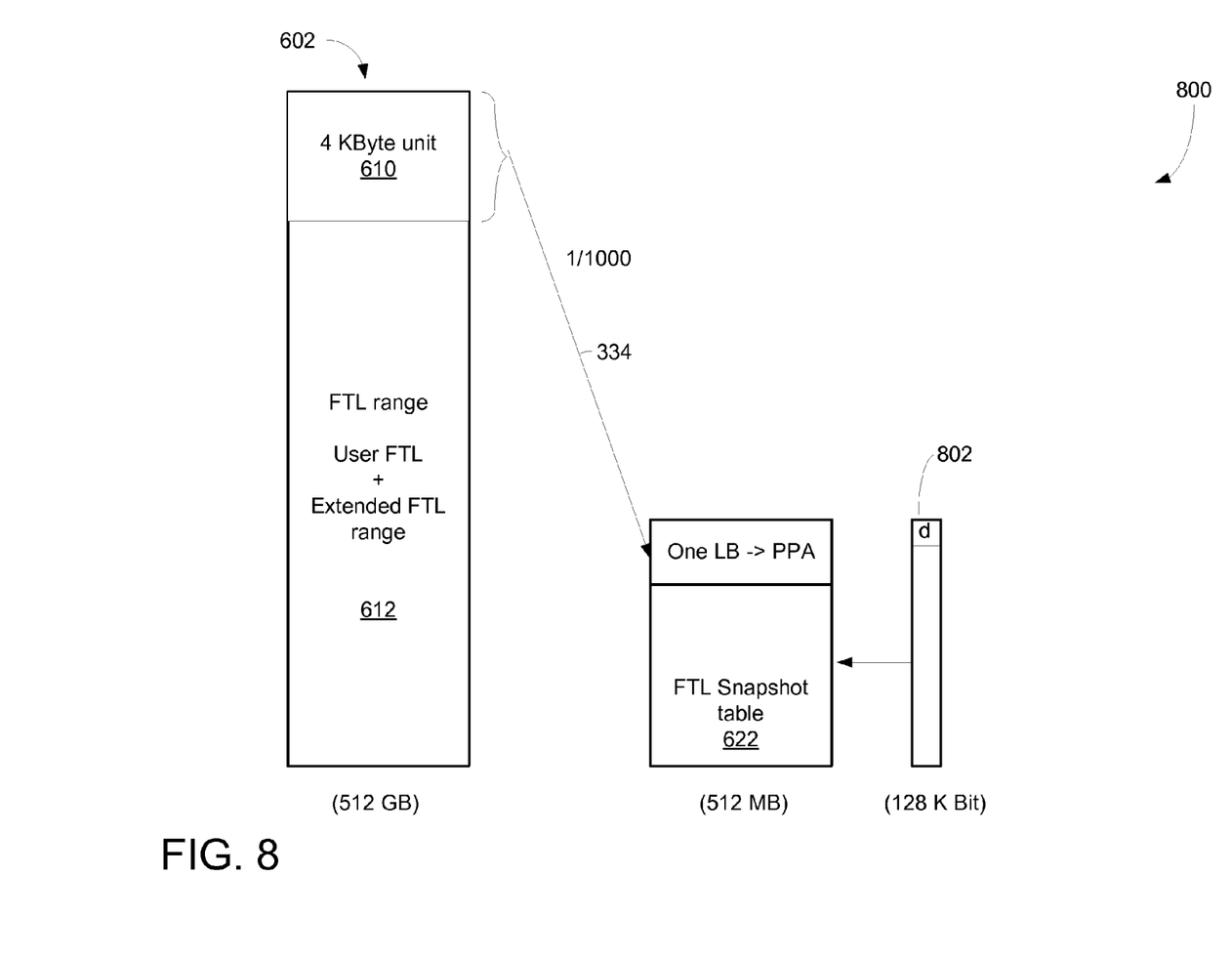
FIG. 8 is a logic diagram illustrating a process of using a set of dirty bits to update the FTL database in accordance with one embodiment of the present invention.

FIG. 8 is a logic diagram 800 illustrating a process of using a set of dirty bits to update the FTL database in accordance with one embodiment of the present invention. Diagram 800 includes storage area 602, FTL snapshot table 622, and table of dirty bits 802 wherein storage area 602 includes storage range 612 and an extended range 610. In one embodiment, both FTL snapshot table 622 and table of dirty bits 802 are stored in extended FTL range 610 as indicated by numeral 334. It should be noted that the underlying concept of the exemplary embodiment(s) of the present invention would not change if one or more blocks (or components) were added to or removed from diagram 800.

Table of dirty bits 802 is updated and/or maintained to indicate changes in the FTL database. For example, to identify which 4 Kbyte of FTL table needs to be rewritten to FTL snapshot table 622, dirty bits are used to correspond entries in the FTL table that have been modified. Before powering down or during operation, portions of FTL table or database are selectively saved in FTL snapshot table 622 according to values of dirty bit(s).

When a snapshot of FTL database is properly saved in FTL snapshot table 622 before powering down, the FTL index table can be loaded into the system memory during the powering up. Upon an IO read request, the corresponding FTL snapshot is read from the flash memory based on indexes in the FTL index table. After the corresponding or portion of FTL database is loaded from FTL snapshot table 622, the portion of FTL database can be used for lookup in accordance with the IO read request. It should be noted that avoiding loading the entire FTL snapshot table from the flash memory into DRAM should allow the storage device to be boot up less than 100 ms.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 9:
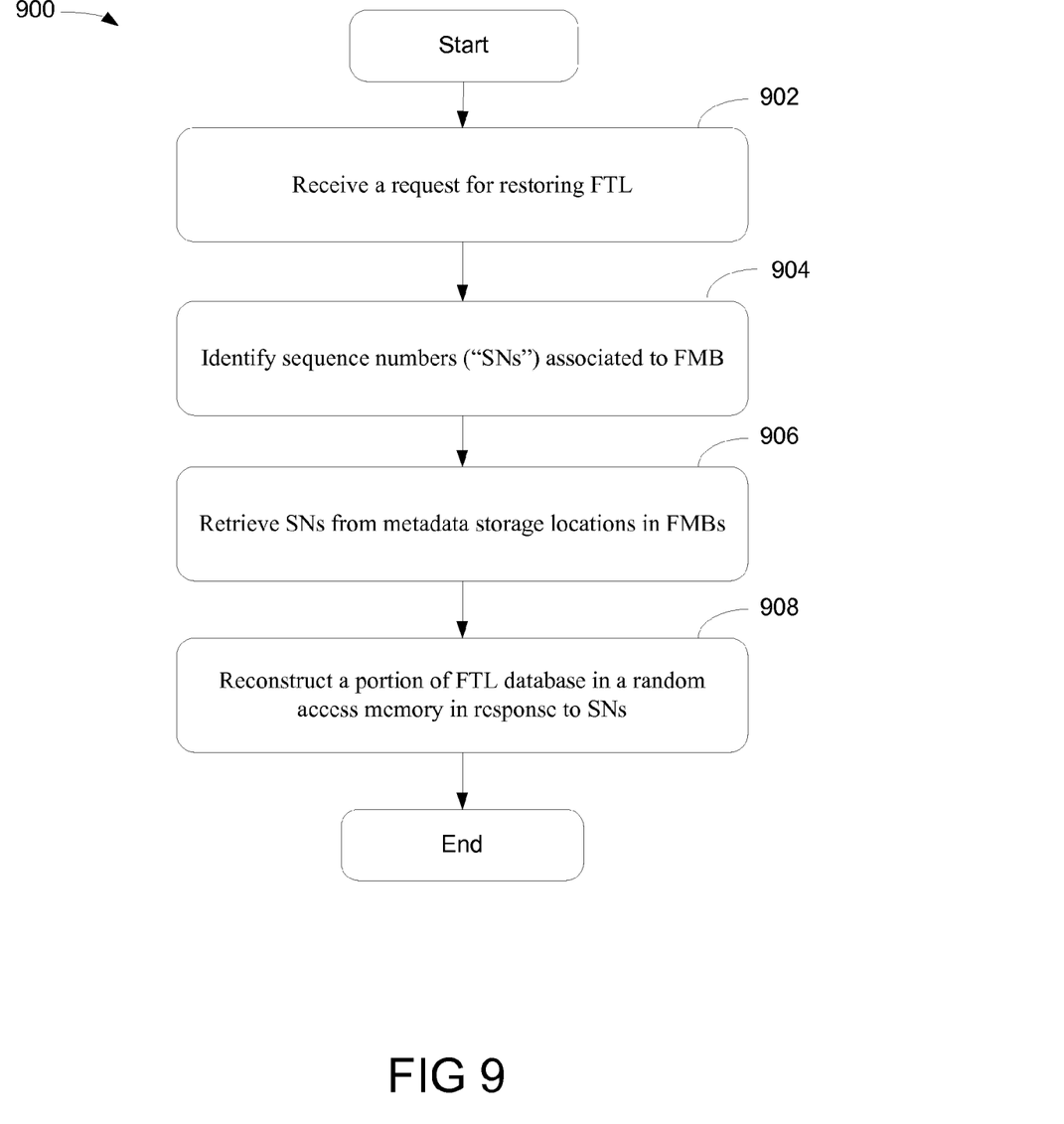
FIG. 9 is a flow diagram illustrating an operation of using SNs to recover the FTL database in accordance with one embodiment of the present invention.

FIG. 9 is a flow diagram 900 illustrating an operation of using SNs to recover the FTL database in accordance with one embodiment of the present invention. At block 902, a process able to restore FTL database receives a request for restoring at least a portion of FTL database after reactivation the VN storage device. In one example, the request for recovery of the FTL database in a volatile memory is issued by a storage controller to reboot the storage device from a previously unintended system power crash. The FTL database may be recovered in a volatile memory and it is subsequently used to generate PPAs based on LBAs.

At block 904, a set of SNs associated with FMBs is identified. SN is generated during the write cycle and is stored at the end of write cycle. Based on values of SNs, the process is able to arrange or sort FMBs in an order based on SN values. Note that the last data written to an FMB should have the largest value of SN while the first data written to an FMB should have the smallest value of SN. A new SN corresponds to the next sequence number. In one embodiment, a new SN is obtained or generated upon receipt of a write command. During the write cycle, the new SN is stored in a predefined storage location such as a state information section of FMB.

At block 906, the SNs are retrieved from information storage locations in the FMBs. In addition, a set of LBAs is retrieved from the predefined metadata storage locations such as metadata sections in the pages or FMPs.

At block 908, a portion of the FTL database is reconstructed in RAM in response to the SNs as well as retrieved LBAs. In one aspect, a set of LBA lists may be fetched from a predefined page in a block and the LBA lists can be used to assist restoring the FTL database more quickly.

Figure 10:
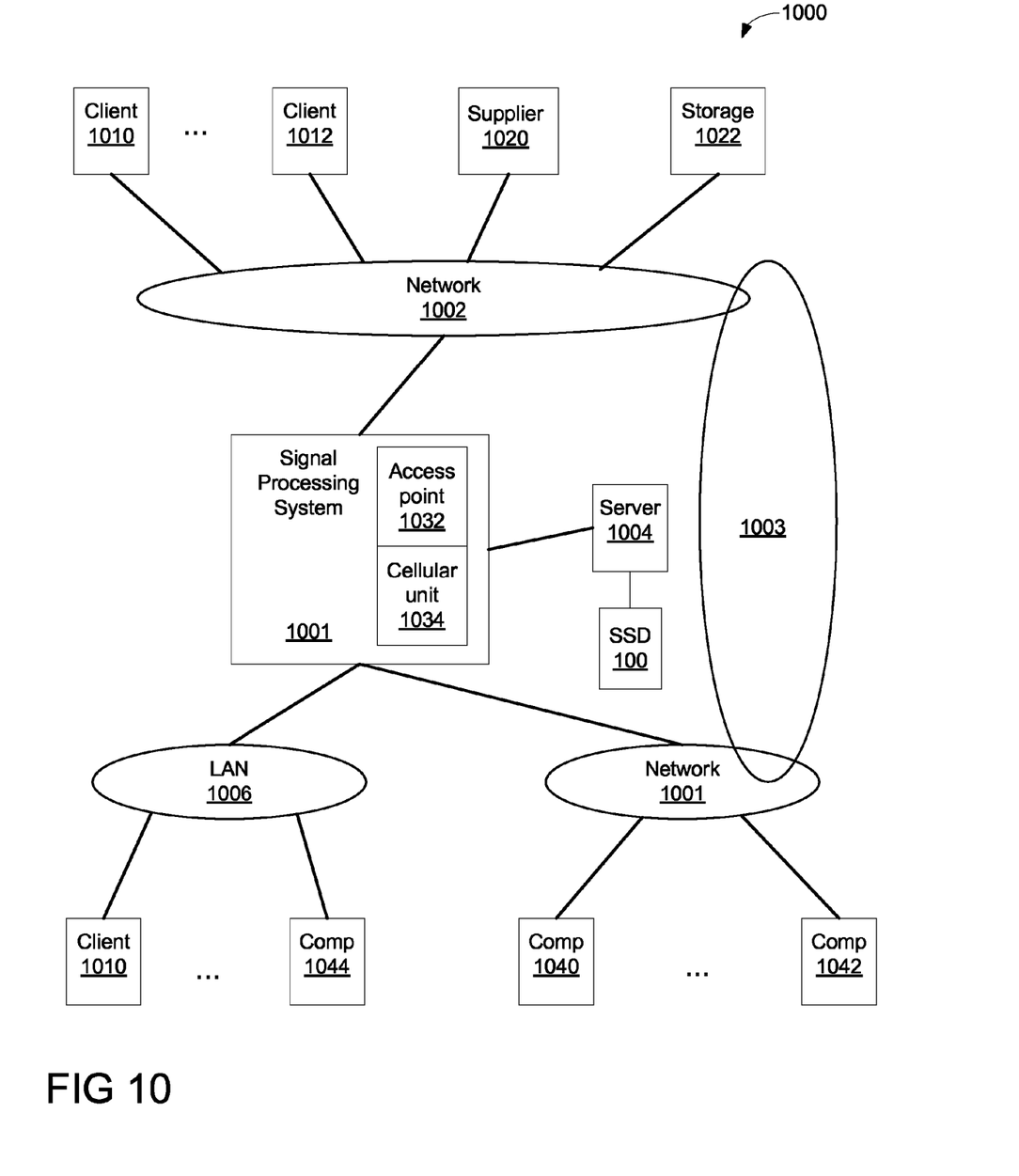
FIG. 10 is a diagram illustrating a computer network capable of providing network routing between users using a storage device capable of restoring the FTL database using SNs in accordance with one embodiment of the present invention.

FIG. 10 is a diagram illustrating a computer network containing various network elements configured to use SN to restore the FTL table or database in accordance with one embodiment of the present invention. In this network environment, a system 1001 is coupled to a wide-area network 1002, LAN 1006, Network 1001, and server 1004. Wide-area network 1002 includes the Internet, or other proprietary networks including America On-Line™, SBC™, Microsoft Network™, and Prodigy™. Wide-area network 1002 may further include network backbones, long-haul telephone lines, Internet service providers, various levels of network routers, and other means for routing data between computers.

Server 1004 is coupled to wide-area network 1002 and is, in one aspect, used to route data to clients 1010-1012 through a local-area network ("LAN") 1006. Server 1004 is coupled to SSD 100 wherein the storage controller is configured to use SN and/or LBA lists to restore the FLT database.

The LAN connection allows client systems 1010-1012 to communicate with each other through LAN 1006. Using conventional network protocols, USB portable system 1030 may communicate through wide-area network 1002 to client computer systems 1010-1012, supplier system 1020 and storage device 1022. For example, client system 1010 is connected directly to wide-area network 1002 through direct or dial-up telephone or other network transmission lines. Alternatively, clients 1010-1012 may be connected through wide-area network 1002 using a modem pool.

Figure 11:
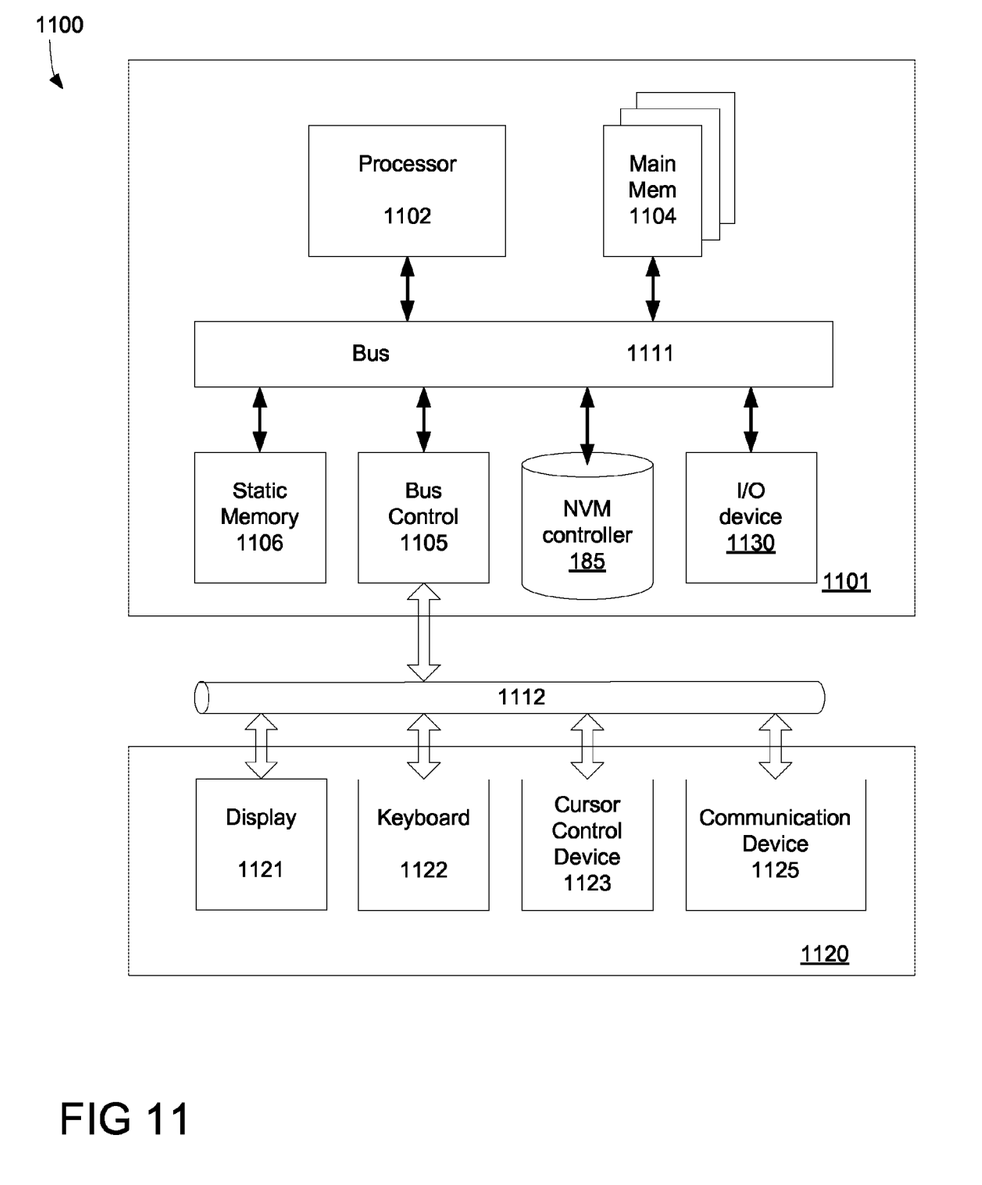
FIG. 11 is a block diagram illustrating a digital processing system capable of restoring the FTL database using SNs in accordance with one embodiment of the present invention.

Having briefly described one embodiment of the computer network in which the embodiment(s) of the present invention operates, FIG. 11 illustrates an example of a computer system 1100, which can be a server, a router, a switch, a node, a hub, a wireless device, or a computer system.

FIG. 11 is a block diagram illustrating a digital processing system capable of restoring the FTL database using SNs in accordance with one embodiment of the present invention. Computer system or a signal separation system 1100 can include a processing unit 1101, an interface bus 1112, and an input/output ("IO") unit 1120. Processing unit 1101 includes a processor 1102, a main memory 1104, a system bus 1111, a static memory device 1106, a bus control unit 1105, an I/O element 1130, and a NVM controller 185. It should be noted that the underlying concept of the exemplary embodiment(s) of the present invention would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112. Mass storage memory or SSD 106, which may be a magnetic disk, an optical disk, hard disk drive, floppy disk, CD-ROM, and/or flash memories are used for storing large amounts of data.

I/O unit 1120, in one embodiment, includes a display 1121, keyboard 1122, cursor control device 1123, and communication device 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers 104 via a network infrastructure such as the infrastructure illustrated in FIG. 11.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for restoring at least a portion of flash translation layer ("FTL") database, comprising:
   receiving a request for restoring at least a portion of FTL database after reactivation of a non-volatile ("NV") storage device;
   identifying a plurality of sequence numbers ("SNs") associated with a plurality of flash memory blocks ("FMBs") generated during write cycle;
   retrieving a plurality of SNs from a plurality of information storage locations in the plurality of FMBs; and
   reconstructing at least a portion of the FTL database in a random access memory ("RAM") in response to the plurality of SNs.

2. The method of claim 1, further comprising obtaining a new SN which corresponds to next sequence number based on a previous sequence number upon receipt of a write command.

3. The method of claim 2, further comprising storing the new SN in a predefined storage location in state information section of a new FMB.

4. The method of claim 1, further issuing the request for recovery of the FTL database in a volatile memory by a storage controller after rebooting the storage device from a previously unintended system power crash.

5. The method of claim 1, wherein receiving a request for restoring at least a portion of FTL database includes recovering FTL database in a volatile memory for generating physical page addresses ("PPAs") in accordance with received logical block addresses ("LBAs").

6. The method of claim 1, wherein identifying a plurality of SNs associated with a plurality of FMBs includes recognizing an order of data to be written to the FMBs based on values of the SNs.

7. The method of claim 1, wherein retrieving a plurality of SNs from a plurality of predefined information storage locations further includes retrieving a plurality of logical block addresses ("LBAs") from the plurality of predefined metadata storage locations in a plurality of pages.

8. The method of claim 7, wherein reconstructing at least a portion of the FTL database includes restoring the FTL based on the retrieved LBAs.

9. A method for restoring at least a portion of flash translation layer ("FTL") database, comprising:
   receiving a request for restoring at least a portion of FTL database after reactivating a non-volatile ("NV") storage device;
   identifying a plurality of logical block addresses ("LBAs") associated with a plurality of flash memory pages ("FMPs") in the NV storage device;
   retrieving a plurality of LBAs from a plurality of metadata storage locations of the plurality of FMPs; and reconstructing at least a portion of FTL database in a random access memory ("RAM") in response to the plurality of LBAs and physical locations of the FMPs within a flash memory block ("FMB").

10. The method of claim 9, further comprising:
storing a first LBA associated with a first physical page address ("PPA") addressing a first page in a metadata page section of the first page when first data is stored in the first page; and
storing a second LBA associated with a second PPA addressing a second page in a metadata page section of the second page when second data is stored in the second page.

11. The method of claim 9, wherein reconstructing at least a portion of FTL database includes replacing a later stored LBA with an earlier stored LBA in same entry of the FTL database.

12. The method of claim 9, wherein receiving a request for restoring at least a portion of FTL database includes recovering the FTL database in a volatile memory capable of converting an LBA to a PPA.

13. The method of claim 9, further comprising retrieving a plurality of sequence number ("SNs") from a plurality of metadata block locations of flash memory blocks ("FMBs").

14. The method of claim 13, wherein reconstructing at least a portion of FTL database includes restoring at least a portion of FTL in response to the LBAs and the SNs.

15. A method for reconstructing at least a portion of flash translation layer ("FTL") database, comprising:
receiving a request for restoring at least a portion of FTL database after reactivating a flash based non-volatile ("NV") storage device;
retrieving a plurality of logical block address ("LBA") lists from a plurality of flash memory blocks ("FMBs") in a flash based data storage device; and
reconstructing at least a portion of FTL database in a random access memory ("RAM") in response to the plurality of LBA lists.

16. The method of claim 15, further comprising:
obtaining a plurality of LBAs stored in metadata sections of pages in a FMB; and
generating an LBA list listing the plurality of LBAs in an order corresponding to physical locations of pages situated in the FMB.

17. The method of claim 16, further comprising:
storing a first LBA associated with a first physical page address ("PPA") addressing a first page in a metadata section of the first page when first data is stored in the first page; and
storing a second LBA associated with a second PPA addressing a second page in a metadata section of the second page when second data is stored in the second page.

18. The method of claim 15, wherein reconstructing at least a portion of FTL database includes restoring at least a portion of FTL in a memory in response to the LBA lists and a plurality of sequence numbers retrieved from the FMBs.

19. A method for enhancing flash translation layer ("FTL") recovery, comprising:
receiving a request for restoring at least a portion of FTL database after reactivating a flash based non-volatile ("NV") storage device;
retrieving an FTL index table containing a plurality of index entries wherein each entry of the plurality of the FTL index table points a unique portion of the FTL snapshot table from a predefined index location of the NV storage device; and
restoring at least a portion of the FTL in a memory in response to the FTL index table and an LBA associated with a storage request.

20. The method of claim 19, further comprising storing the FTL index table as a FTL snapshot in a non-volatile storage space before the NV storage device powers down.

21. The method of claim 19, further comprising maintaining a table of dirty bits to indicate changes within the FTL database snapshot.

22. The method of claim 21, further comprising storing portions of the FTL snapshot table in a non-volatile storage memory based on values of corresponding dirty bits before the NV storage device powers down.

23. The method of claim 19, further comprising storing an FTL database snapshot before the NV storage device powers down.

* * * * *